United States Patent [19]

Kooyumjian

[11] Patent Number: 4,523,657
[45] Date of Patent: Jun. 18, 1985

[54] WINTERFRONT WITH ADJUSTABLE CENTER OPENING

[75] Inventor: Thomas A. Kooyumjian, Cook County, Ill.

[73] Assignee: Belmor Manufacturing Company, Chicago, Ill.

[21] Appl. No.: 372,082

[22] Filed: Apr. 26, 1982

[51] Int. Cl.³ .................... F28F 13/06; B60K 11/08
[52] U.S. Cl. .................. 180/68.1; 180/68.4; 160/DIG. 1; 296/91; 165/98
[58] Field of Search ............ 180/68.4, 68.6, 68.1; 296/91; 160/DIG. 1, DIG. 2, 368 R; 165/98; 237/79

[56] References Cited

U.S. PATENT DOCUMENTS

| | | | |
|---|---|---|---|
| 901,616 | 10/1908 | Hobbs | 160/368 R |
| 1,407,216 | 2/1922 | Potter | 165/98 |
| 1,602,801 | 10/1926 | Walker | 160/DIG. 1 |
| 2,020,838 | 11/1935 | Kaemmer | 160/368 R |
| 2,053,576 | 9/1936 | Osten | 160/DIG. 1 |
| 2,070,919 | 2/1937 | Posey | 160/DIG. 1 |
| 2,155,439 | 4/1939 | Morrison | 160/DIG. 1 |

OTHER PUBLICATIONS

Belmor Manufacturing Co. Advertising Sheet for Belmor Product No. WF-1494.
Belmor Manufacturing Co. Advertising Sheet for Belmor Product No. WF-1369.
Belmor Manufacturing Co. Advertising Sheet for Belmor Product No. WF-1397A.
Belmor Manufacturing Co. Advertising Sheet for Belmor Product No. WF-1206.

*Primary Examiner*—Richard A. Bertsch
*Attorney, Agent, or Firm*—Allegretti, Newitt, Witcoff & McAndrews, Ltd.

[57] ABSTRACT

An improved winterfront is disclosed for use on trucks having grills without a center bar spanning the width of the grill. The winterfront is mounted in front of a grill on the truck in order to restrict the quantity of cold ram air that would otherwise flow through the grill and then around and through the engine fan toward the engine and driver's compartment of the truck. The winterfront includes a ram-air-blocking portion and fasteners that removably fasten the ram-air-blocking portion to the truck. The winterfront also includes an opening completely surrounded by the ram-air-blocking portion of the winterfront. The opening in the blocking portion has a center which is aligned with the axis of rotation of the engine fan so that the flow of air through the opening is directed symmetrically about the axis of rotation of the engine fan.

4 Claims, 4 Drawing Figures

WINTERFRONT WITH ADJUSTABLE CENTER OPENING

BACKGROUND

The present invention relates to an improved winterfront to restrict the flow of cold ram air through the grill of a moving truck having a grill without a center bar spanning the width of the grill. More specifically, this invention relates to a winterfront with an air opening that is symmetrical about the axis of rotation of the engine fan of such trucks.

Winterfronts have long been used on large trucks during periods of cold weather in order to restrict the flow of cold ram air through the grills of the trucks. Absent the use of such a winterfront, ram air impacting the grill of a moving truck flows through the entire front face of the grill, past the radiator, and then through and around the engine fan toward the engine and driver's compartment of the truck. With such a winterfront, ram air impacting the front of the moving truck is allowed to contact and flow through only a portion of the grill. Hence, the winterfront restricts the quantity of ram air flowing through the grill, past the radiator, and past the engine fan to the engine or driver's compartment.

The winterfronts in the prior art are comprised of a ram-air-blocking fabric that covers a portion of the grill of the truck and fasteners that serve to removably attached the fabric to the truck grill. The fabric is usually comprised of one or more sections of sandwiched, weather resistant polymeric sheets, and the fasteners are often "common sense" or "lift-the-dot" type with the male or stud parts of the fasteners being attached to the grill or other front section on the truck and the female parts being attached to the periphery of fabric.

For trucks with grills that do not have a center bar spanning the width of the grill, the winterfronts in the prior art have, in their ram-air-blocking portions, air openings that are off-center or asymmetrical about the center of the radiator—the position on the radiator which lies in a line that is approximately colinear with the axis of rotation of the engine fan. Only a portion of the ram air impacting the winterfront is allowed through these asymmetrical openings. The openings are either (a) "V" shaped openings abutting the upper half of the radiator, (b) inverted "V" shaped openings abutting the lower half of the radiator, or (c) rectangular shaped openings abutting either the uppermost portion or lowermost portion of the grill. Examples of some of these types of winterfronts are Product Nos. WF-1369 and WF-1206 manufactured by Belmor Manufacturing Co., Chicago, Ill.

These winterfronts in the prior art have not provided for a symmetrical distribution of ram air through the radiator about the axis of rotation of the engine fan. As a result, the winterfronts in the prior art cause an uneven or asymmetrical distribution of ram-air foces on the rotating fan blades of the truck's engine fan. Even though years ago it became widely known in the industry that this uneven distribution of ram air forces on the fan blades was possibly causing unnecessary damage to fan blades, fan axles, and fan bearings, no workable solution to the problem has been found prior to the present invention disclosed herein.

The problem of asymmetrical and off-center distribution of ram air about the axis of rotation of the engine fan became even more acute in the mid-seventies because of the fuel shortage. That is, the problem became even more acute because of its effect on certain types of "uncoupling" engine fans, leading to decreased engine efficiency and increased fuel consumption.

As far back as the early seventies, truck manufacturers began to attempt to increase the efficiency of their engines by installing engine fans that ucouple, either partially or totally, when a temperature sensor senses that the engine has been cooled to the desired level. The rotation of such fans thus slows down or ceases until the temperature sensor senses that the temperature of the engine has risen above a certain level. Once the temperature of the engine is sensed to have risen above that certain level, the fan is again engaged to cool the engine down. Because such an engine fan operates only as necessary for cooling the engine, they are much more efficient than permanently coupled fans and result in increased fuel efficiency of the truck. As the fuel shortage of the mid-seventies appeared, such uncoupling fans became recognized as an extremely useful and economical method of increasing the fuel efficiency of truck engines.

Many of the temperature sensors referred to above are of the "viscous clutch" type, which sense the temperature of air near the area surrounding the fan axle of the engine fan. When winterfronts having asymmetrical or off-center openings are used on trucks having such "viscous clutch" temperature fans, the flow of air past the centrally located temperature sensor is severely restricted. The lack of direct ram air flow past the sensor causes the senor to sense a higher temperature so the sensor needlessly engages, or increases the rotational velocity of, the fan. The result is an overall decrease in engine efficiency and corresponding increase in fuel consumption by the truck.

In addition, for all types of "uncoupling" engine fans, the impact of the ram air against the fan blades of the engine fan causes a "free wheeling" effect. That is, the engine fan is driven by the air impacting the fan blades without any driving force or effort from the engine of the truck. However, the winterfronts in the prior art having asymmetrical or off-center openings do not fully utilize this free wheeling effect since ram air unevenly impacts the fan blades. This lack of full utilization of the free wheeling effect causes an additional overall decrease in efficiency of the engine on the truck.

Lastly, those winterfronts in the prior art that have asymmetrical openings in the upper portion of the winterfront often cause heating problems in cab-over-engine type trucks. Such winterfronts direct cold ram air over the top of the engine against the floorboard or instrument panel of the passenger compartment.

It is therefore an object of the present invention to provide for use on trucks that do not have a center bar spanning the width of their grills a winterfront that provides a more even distribution of ram air forces on the fan blades, fan axle, and fan bearings of a truck.

It is a further object of the present invention to provide for trucks without such center bars a winterfront that directs ram air through the grill toward and around the fan axle of the engine fan. In this way, a "viscous clutch" type engine fan will more properly engage or disengage, thereby increasing the engine efficiency and decreasing fuel consumption of the truck.

It is also an object to provide a more complete, symmetrical, and centered distribution of ram air on the fan blades of trucks so that an "uncoupling" type engine fan can fully utilize the free wheeling effect to increase engine efficiency.

It is yet another object of the present invention to provide for cab-over-engine type trucks without center bars on the grill, a winterfront that directs the cold ram air against the engine fan and engine rather than against the floorboard or instrument panel of the cab.

It is also an object of this invention to provide trucks without such center bars a winterfront with a center opening that is adjustable in size, and no matter how adjusted, always provides a more even distribution of ram air forces on the fan blades, fan axle, and fan bearings of a truck.

Other objects and advantages of the present invention will become apparent as the specification proceeds.

SUMMARY OF THE INVENTION

The above-noted and other objects and advantages are accomplished by my invention of an improved winterfront for use on a moving vehicle having a vehicle air passage and an engine fan with fan blades extending radially outwardly from a fan axle. The fan axle is substantially parallel to the flow of ram air impacting the vehicle air passage during forward motion of the vehicle.

The winterfront is of the type having a ram-air-blocking portion and a means for attaching the ram-air-blocking portion to the vehicle to restrict the quantity of air flowing through the vehicle air passage. The improvement comprises a ram-air-blocking portion that has an outer periphery completely surrounding a center opening having both a center and center periphery. The center periphery is symmetrical about the center of the center opening and the center of the opening is aligned with the axis of rotation of the fan axle so that ram air flowing through the vehicle air passage is directed symmetrically about the fan axle's axis of rotation.

DESCRIPTION OF THE PREFERRED EMBODIMENT

Figure 1:
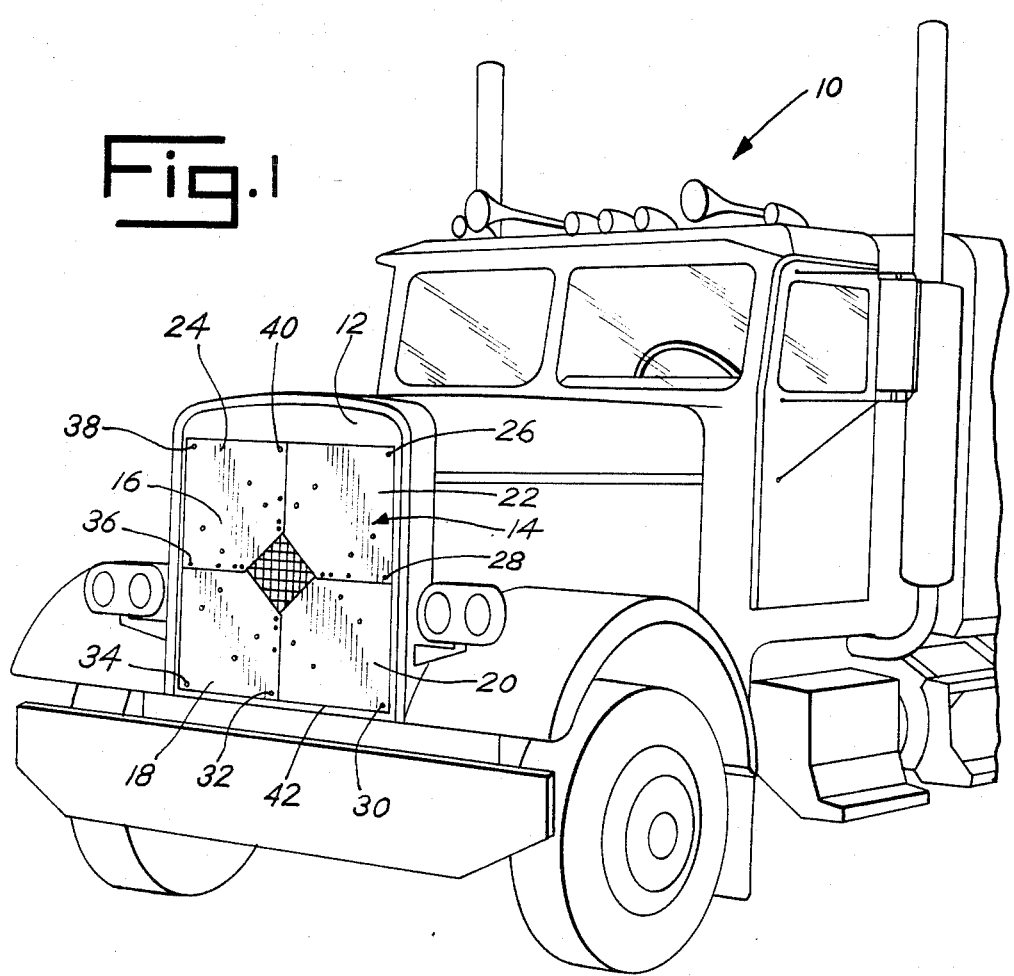
FIG. 1 is a partial perspective view of a portion of a semi-tractor truck with a one-piece grill and having an improved winterfront mounted on the grill of the truck.

Because of the great variety of shapes of radiators and grills on trucks having grills without center bars spanning the width of the grills, it must be understood that the preferred embodiment described herein and shown in the drawing is the preferred embodiment for only certain types of such trucks. By simply varying the shape of the preferred embodiment disclosed herein, the front grills and radiators of other such trucks may be easily accommodated.

Referring now to FIG. 1, the front portion of a semi-tractor truck having a one-piece grill is shown generally at 10. The preferred embodiment of the winterfront, generally 14, is attached to the grill 12 of the truck 10. The grill 12 is directly in front of the radiator (not shown in FIG. 1) and provides an air passage through which ram air impacting the front of the truck 10 flow into the engine campartment (not shown) of the truck 10.

The improved winterfront 14 has a ram-air-blocking portion that is made of four polygonal sections 18, 20, 22, and 24, all of substantially identical dimensions. The sections 18, 20, 22, and 24 are stitched together side by side such that each section occupies one corner of the rectangular outer perimeter 42 of the entire, unitary winterfront 14.

The first section 18 occupies the lowermost corner on the passenger side of the outer perimeter 42 of the winterfront 14, and the second section 20 occupies the lowermost corner on the operator side of the outer perimeter 42 of the winterfront. The third section 22 occupies the uppermost corner on the operator side of the outer perimeter 42 of the winterfront 14, and the fourth section 24 occupies the uppermost corner on the passenger side of the outer perimenter 42 of the winterfront 14.

The four sections 18, 20, 22, and 24 are each made of weather resistant fabric and their abutting edges are stitched together with a weather resistant thread. The fabric of the preferred embodiment is a triple-laminated synthetic having a layer of 13×13 mesh, 1000 Diernier polyester sandwiched between two layers of vinyl. All stitching is done with No. 92 Dacron thread.

The improved winterfront 14 is removably attached to the grill 12 by means of eight Durable fasteners 26, 28, 30, 32, 34, 36, 38, and 40 made of stainless steel. The button portions of the fasteners 26, 28, 30, 32, 34, 36, 38, and 40 are attached to the ram-air-blocking portion at equally spaced intervals near its rectangular outer perimeter 42. The mating stud portions of the fasteners 26, 28, 30, 32, 34, 36, 38 and 40 are attached to the one-piece grill 12 on the truck 10 at reciprocally spaced intervals so that the winterfront 14 is easily and removably attachable to the grill 12 of the truck 10.

As noted above, each of the four fabric sections 18, 20, 22, and 24 are nearly identical in geometric shape and construction. As shown, for example, in FIG. 2 for the first fabric section 18 that section 18 is a five sided polygon with four of the edges 44, 46, 50, and 52 nearly forming a rectangle. The first 52 and second 44 edges form the lowermost, passenger side corner of the outer perimeter 42 of the ram-air-blocking portion 102, and the third 50 and fourth 46 edges lie along lines that are perpendicular both to each other and to the axis for rotation of the fan axle 100 and that intersect at a point approximately along the axis of rotation of the axle 100. The fifth edge 48 disrupts the rectangle of the four sides, 44, 46, 50, and 52, by cutting across the third 50 and fourth 46 sides at a 45° angle to each of those sides 50 and 46. Each of the sides 44, 46, 48, 50 and 52 is hemmed to add strength to, and prevent fraying of, the fabric section 18.

As noted above, the four fabric sections 18, 20, 22, and 24 are aligned one next to the other so that the outer perimeter 42 of the unitary winterfront 14 forms a rectangle. Abutting edges of the sections 18, 20, 22, and 24 are stitched together along a three inch portion nearest the outer perimeter 42 of the winterfront 14. In addition, the portion of each pair of overlapping edges that is not stitched together is joinable in two places by means of Durable fasteners, which are also made of steel.

Figure 2:
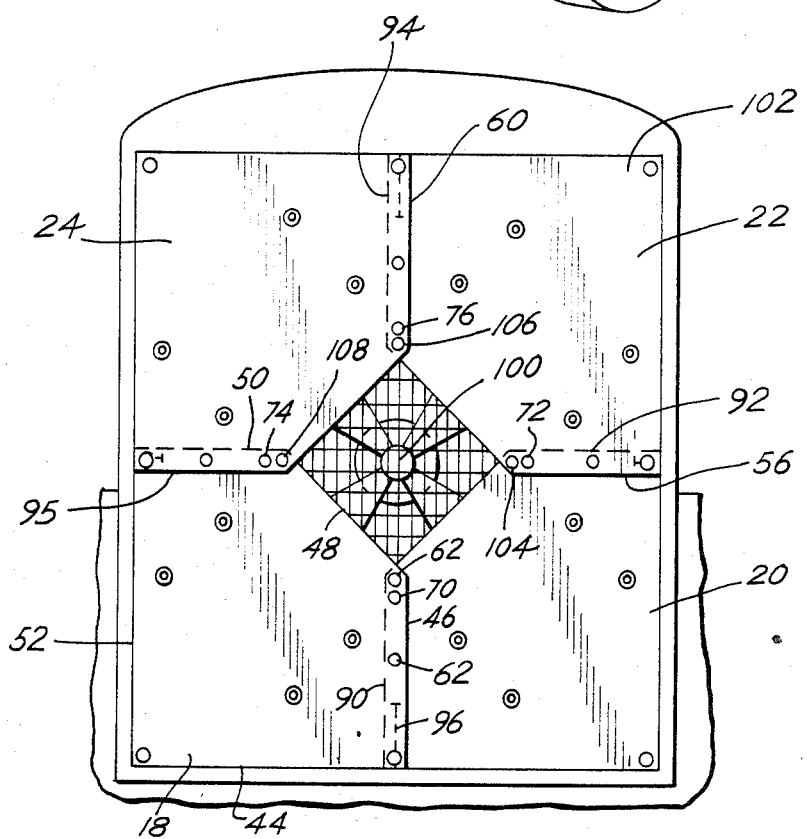
FIG. 2 is a plan view of an improved winterfront mounted on the grill of a truck having a one-piece grill, showing how the winterfront's flaps can be fully extended to provide a relatively small symmetrical air passage in the center of the winterfront.

As shown in FIG. 2 for the overlapping edges 46 and 90 of the first fabric section 18 and the second fabric section 20 the first fastener 62 is inserted near the point of overlap nearest the axis of rotation of the fan axle 100. The second fastener 64 is inserted in the overlap about three and one-half inches from the first fastener 62. The female portions of the fasteners 62 and 64 are inserted in the overlapping edge 46 of the first section 18 and the stud portions are inserted in the underlying edge 90 of the second section 20.

Figure 3:
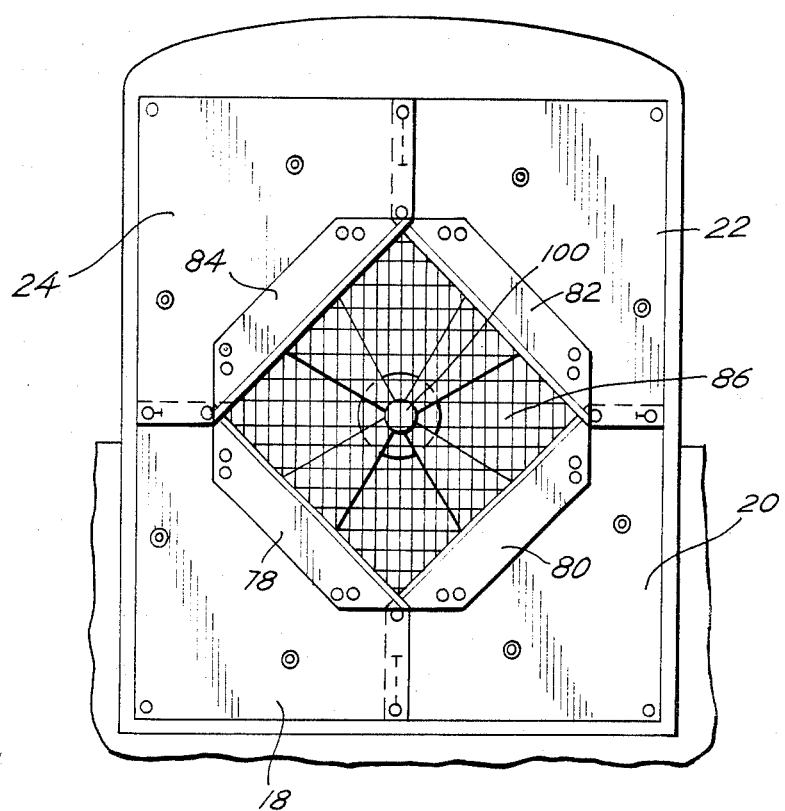
FIG. 3 is also a plan view of an improved winterfront mounted on the grill of a truck having a one-piece grill, showing how the winterfront's flaps, when secured in a partially folded position, provide an enlarged, yet still substantially symmetrical, center air passage in the winterfront.
Figure 4:
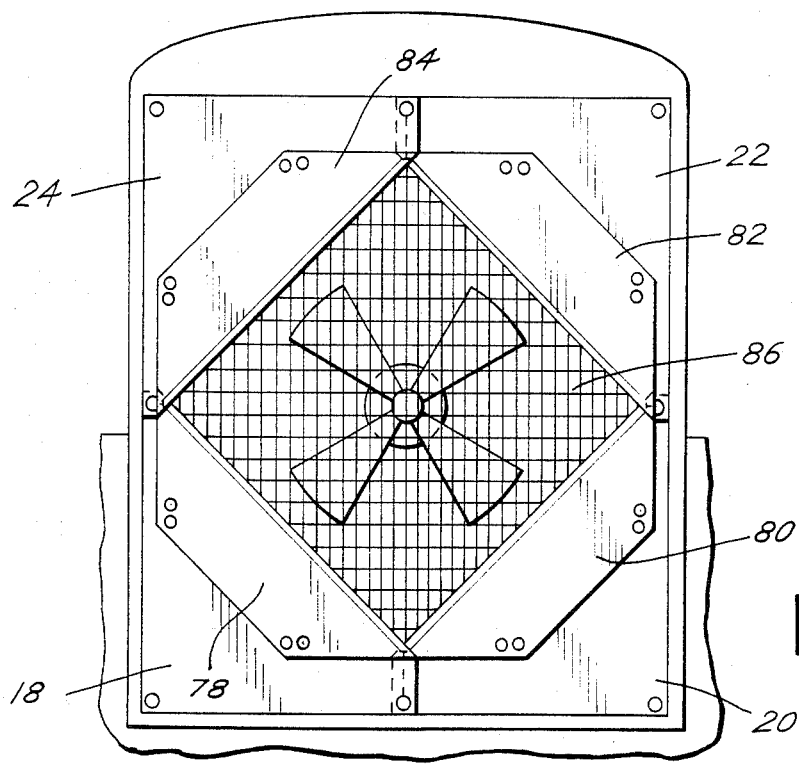
FIG. 4 is another plan view of an improved winterfront mounted on the grill of a truck having a one-piece grill, showing how the flaps, when all secured in a fully folded position, provide an even larger, yet still substantially symmetrical, center air passage in the winterfront.

Four additional female portions of fasteners are mounted receptacle side forward in a rectangular array on each of the four sections 18, 20, 22 and 24. In addition, four additional stud portions 70, 72, 74, and 76 are also mounted on the winterfront 14: the first extra stud portion 70 is mounted mating side forward in the first section 18; the second extra stud portion 72 is mounted mating side forward in the third section 22; the two extra stud portions 74 and 76 are mounted mating side forward in the fourth section 24. The extra stud portions 70, 72, 74, and 76, the four stud portion of the four fasteners 62, 104, 106, and 108 nearest fan 100, and the rectangularly arranged female portions are all spacially arranged on the sections 18, 20, 22, and 24 such that the fasteners holding the edges of the sections 18, 20, 22, and 24 together can be undone, as shown in FIGS. 3 and 4, and the first 78, second 80, third 82, and fourth 84 flaps can be folded over onto the first 18, second 20, third 22, and fourth 24 sections, respectively, and removably fastened thereto in order to create successively larger, square or nearly square passages or center openings 86 in the center of the winterfront 14. The center passages 86 thus remain not only centrally located with respect to the fan axle 100, but also "symmetrical" about the axis of rotation of the fan axle 100. That is, on any one line passing through both the periphery of the air passage 86 and the axis of rotation of the far axle 100, the distance from the axis to the periphery on one side of the axis is equal or nearly equal to the distance from the axis to the periphery on the other side of side of axis.

It should be noted that the size of the center opening 86 of the preferred embodiment is adjustable to form differently sized, yet always symmetrically shaped openings 86. Moreover, any adjustment of any one of the flaps 78, 80, 82, or 84 requires that all other flaps 78, 80, 82, or 84 be correspondingly adjusted. Thus, the center opening 86 remains symmetrical about the axis of rotation of the fan axle 100 at all times and cannot be adjusted in any way that would yield an asymmetrical center opening 86.

The preferred embodiment herein disclosed provides a relatively inexpensive and easily manufactured winterfront that overcomes many, if not all, of the problems created through use of the winterfronts in the prior art for trucks having one-piece grills. While there has long been a need for such an improved winterfront, no such device has heretofore been made or used. This has been so despite a substantial, long-existing market for winterfronts—a market which presently yields sales in the amount of more than $3,000,000.00 per year.

Since my invention as disclosed herein may be embodied in many other specific forms without department from its nature or central characteristics, the preferred embodiment herein described must be considered simply as illustrative and not restrictive. The scope of my invention is thus indicated by the following claims rather than the foregoing detailed description, and all changes which come within the meaning and range of equivalency of the claims are intended to be embraced therein.

I claim:

1. An improved winterfront of the type that is utilized to restrict the flow of ram air through an air passage on a moving truck having a cab with a single engine fan with a fan axle and fan blades extending radially outwardly from the fan axle, said fan axle being substantially parallel to the direction of the flow of ram air through the air passage during forward motion of the truck, said winterfront having a ram-air-blocking portion and means for removably attaching said ram-air-blocking portion to the truck to reduce the flow of air through the air passage, the improvement comprising:

a ram-air-blocking portion having at least a first foldable fabric portion, a second foldable fabric portion, a third foldable fabric portion, a fourth foldable fabric portion, and a center opening with a center point and a periphery formed by said first, second, third, and fourth foldable fabric portions, said periphery being symmetrical about the center point of the center opening, each of said foldable fabric portions having at least first, second, and third sides, means for connecting said first side of each foldable fabric portion to the second side of another foldable fabric portion, and means for connecting said second side of each foldable fabric portion to the first side of another foldable fabric portion, said second side of said first foldable fabric portion abutting the first side of said second foldable fabric portion, said second side of said second foldable fabric portion abutting the first side of said third foldable fabric portion, said second side of said third foldable fabric portion abutting the first side of said fourth foldable fabric portion, said second side of said fourth foldable fabric portion abutting the first side of said first foldable fabric portion, each of said foldable fabric portions being foldable into first and second folded sections and having means for connecting said first folded section to said second folded section so that the size of said center opening can be increased or decreased while remaining symmetrical about the center of the center opening whereby the center point is aligned with the axis of rotation of the fan axle when the ram-air-blocking portion is attached to the truck to reduce the flow of air through the air passage on the truck.

2. An improved winterfront of the type mountable on the grill of a truck to restrict the flow of ram air through the radiator of the truck when in forward motion, the truck having a single engine fan with fan blades extending radially outwardly from a fan axis, the fan axis being substantially parallel to the direction of flow of ram air through the radiator during forward motion of the truck, the improved winterfront comprising:

a unitary ram-air-blocking portion and means for removably attaching the ram-air-blocking portion to the grill of the truck, the unitary ram-air-blocking portion having (a) a center opening being symmetrical about a center point, (b) at least four fabric sections joined to form a periphery around the center opening in the ram-air-blocking portion, and (c) means for expanding and contracting the periphery of the center opening symmetrically about the center point whereby the center point is coincident with axis of rotation of the engine fan when the improved winterfront is mounted on the grill of the truck.

3. The improved winterfront of claim 2 wherein each of the fabric sections is foldable and unfoldable so that the size of the center opening can be increased or decreased while remaining symmetrical about the center point.

4. The improved winterfront of claim 3 wherein each of the fabric sections is foldable into first and second sheet portions and has means for removably attaching the first sheet portion to the second sheet portion so that the fabric section, when the first sheet portion is folded over and attached to the second sheet portion, remains folded during use of the winterfront on the vehicle.

* * * * *